United States Patent
Tegegne et al.

(10) Patent No.: US 9,922,352 B2
(45) Date of Patent: Mar. 20, 2018

(54) MULTIDIMENSIONAL SYNOPSIS GENERATION

(71) Applicant: Quest Software Inc., Aliso Viejo (CA)

(72) Inventors: Abel Tegegne, Ottawa (CA); Vineetha Abraham, Kanata (CA); Mitch Brisebois, Renfrew (CA)

(73) Assignee: Quest Software Inc., Aliso Viejo, CA (US)

( * ) Notice: Subject to any disclaimer, the term of this patent is extended or adjusted under 35 U.S.C. 154(b) by 0 days.

(21) Appl. No.: 15/005,840

(22) Filed: Jan. 25, 2016

(65) Prior Publication Data
US 2017/0213258 A1  Jul. 27, 2017

(51) Int. Cl.
*G06Q 30/02* (2012.01)
*G06F 17/27* (2006.01)

(52) U.S. Cl.
CPC ..... *G06Q 30/0282* (2013.01); *G06F 17/2785* (2013.01); *G06Q 30/0278* (2013.01)

(58) Field of Classification Search
CPC .................................................. G06F 17/2785
See application file for complete search history.

(56) References Cited

U.S. PATENT DOCUMENTS

| | | | | |
|---|---|---|---|---|
| 7,152,031 B1* | 12/2006 | Jensen | ................ | G06F 17/2785 704/1 |
| 8,265,925 B2* | 9/2012 | Aarskog | ................ | G06F 17/271 704/1 |
| 8,341,101 B1* | 12/2012 | Treiser | ................... | G06Q 30/02 706/45 |
| 8,463,595 B1* | 6/2013 | Rehling | ............ | G06F 17/30864 704/9 |
| 8,600,796 B1* | 12/2013 | Sterne | ................ | G06Q 30/0201 705/7.29 |
| 8,918,312 B1* | 12/2014 | Rehling | .............. | G06F 17/2785 704/9 |
| 9,177,554 B2* | 11/2015 | Bhatt | ....................... | G10L 15/26 |
| 2004/0049478 A1* | 3/2004 | Jasper | ............... | G06F 17/30705 |
| 2004/0049505 A1* | 3/2004 | Pennock | ........... | G06F 17/30592 |
| 2007/0244888 A1* | 10/2007 | Chea | ................. | G06F 17/30861 |
| 2008/0133488 A1* | 6/2008 | Bandaru | ........... | G06F 17/30864 |
| 2011/0238410 A1* | 9/2011 | Larcheveque | ...... | G06F 17/2785 704/9 |

(Continued)

OTHER PUBLICATIONS

Das, Mahashweta, et al. "Who tags what?: an analysis framework." Proceedings of the VLDB Endowment 5.11 (2012): 1567-1578.*

(Continued)

*Primary Examiner* — Brian Albertalli
(74) *Attorney, Agent, or Firm* — Kirton McConkie; Brian Tucker (57) ABSTRACT

A multidimensional synopsis of a stream of textual data pertaining to a particular subject can be generated. To produce the multidimensional synopsis, multiple dimensions that each includes concepts can be identified. The stream of textual data can then be analyzed to identify the occurrence of the concepts within elements of the stream. The multidimensional synopsis can then be produced by generating a score for each intersecting set of concepts from the multiple dimensions. Therefore, each score can generally represent a prevalence of the corresponding intersecting set of concepts within the stream of textual data.

15 Claims, 11 Drawing Sheets

(56) References Cited

U.S. PATENT DOCUMENTS

| | | | | |
|---|---|---|---|---|
| 2011/0246179 A1* | 10/2011 | O'Neil | ................ | G06F 17/2765 704/9 |
| 2013/0179149 A1* | 7/2013 | Talley | ................ | G06F 17/2775 704/9 |
| 2014/0136185 A1* | 5/2014 | Bhatt | ................ | G06F 17/30707 704/9 |
| 2014/0189022 A1* | 7/2014 | Strumwasser | .......... | H04L 67/22 709/206 |
| 2014/0258312 A1* | 9/2014 | Hamborg | .......... | G06F 17/30592 707/749 |
| 2015/0149153 A1* | 5/2015 | Werth | ................ | G06F 17/2785 704/9 |
| 2015/0161103 A1* | 6/2015 | Bellenger | ........... | G06F 17/2785 704/9 |
| 2016/0098480 A1* | 4/2016 | Nowson | ............. | G06F 17/2785 707/738 |
| 2017/0193397 A1* | 7/2017 | Kottha | ................ | G06N 99/005 |

OTHER PUBLICATIONS

Liu, Bing, Minqing Hu, and Junsheng Cheng. "Opinion observer: analyzing and comparing opinions on the web." Proceedings of the 14th international conference on World Wide Web. ACM, 2005.*

Das, Mahashweta, et al. "Mri: Meaningful interpretations of collaborative ratings." Proceedings of the VLDB Endowment 4.11 (2011).*

Desmond, Michael, et al. "A social analytics platform for smarter commerce solutions." IBM Journal of Research and Development 58.5/6 (2014): 10-1.*

Yang, Zaihan, et al. "Parametric and non-parametric user-aware sentiment topic models." Proceedings of the 38th International ACM SIGIR Conference on Research and Development in Information Retrieval. ACM, 2015.*

* cited by examiner

MULTIDIMENSIONAL SYNOPSIS GENERATION

CROSS-REFERENCE TO RELATED APPLICATIONS

N/A

BACKGROUND

The volume of textual data has increased due to the prevalence of internet use. This textual data is in the form of discussion forums, customer reviews, social media feeds, contact center records, support tickets, conversations in collaboration solutions, event logs, etc. In some cases, this textual data can have several thousands of data points for a given subject. For example, it is common to see dozens, hundreds or even thousands of online reviews of a product. Similarly, there may be dozens of discussions for a single support ticket.

This increasing volume of textual data makes it difficult to make good sense of the textual data against different dimensions by just reading or observing the textual information. It is difficult to extract information from a textual data stream that is particularly valuable to the features and dimensions that are of interest to an observer. For example, from just a stream of textual reviews and ratings of a camera, is it difficult to identify how the reviews relate to travelers, experienced photographers, or camera size. Similarly, within an enterprise collaboration tool, it is difficult to identify the key items discussed in a discussion thread.

BRIEF SUMMARY

The present invention extends to methods, systems, and computer program products for generating a multidimensional synopsis of a stream of textual data pertaining to a particular subject. To produce the multidimensional synopsis, multiple dimensions that each includes concepts can be identified. The stream of textual data can then be analyzed to identify the occurrence of the concepts within elements of the stream. The multidimensional synopsis can then be produced by generating a score for each intersecting set of concepts from the multiple dimensions, and therefore each score can generally represent a prevalence of the corresponding intersecting set of concepts within the stream of textual data.

For example, in the case where the stream of textual data may be user reviews of a camera, a first dimension can include concepts representing features of the camera and a second dimension can include concepts representing attributes of authors of the user reviews. Each review and possibly a corresponding user profile could then be analyzed to identify the camera features (or camera concepts) addressed in the review as well as attributes of the review's author (or author concepts). These intersections of camera/author concepts, as well as any quantitative value assigned to the concepts, could be employed to generate a score representing how prevalent each intersection of concepts is within the stream of textual data. For example, a score could be generated to identify a sentiment of professional users (which is an author concept) towards a cost feature of the camera (which is a camera concept). These scores of the multidimensional synopsis can therefore provide a better indicator of how the stream of camera reviews may relate to a particular type of user and to a particular feature of the camera.

In one embodiment, the present invention is implemented as a method for generating a multidimensional synopsis of a stream of textual data. A stream of textual data that includes a number of elements of textual data is accessed. Each element of textual data is associated with an author and is directed to a particular subject. A first dimension and a second dimension for the stream of textual data are identified. The first dimension includes a number of concepts that each represent a subject attribute, while the second dimension includes a number of concepts that each represent an author attribute. Each of the number of elements of textual data is processed to identify which of the concepts of the first and second dimension appear in the element. The multidimensional synopsis of the stream of textual data is then generated by generating a score for each intersecting set of concepts. Each score represents a prevalence of the intersecting set of concepts within the stream of textual data.

In another embodiment, the present invention is implemented as one or more computer storage media storing computer executable instructions which when executed by one or more processors implements a method for generating a multidimensional synopsis of a stream of textual data, the method comprising: accessing a stream of textual data that includes a number of elements of textual data, each element of textual data being associated with an author and being directed to a particular subject; identifying a first dimension and a second dimension for the stream of textual data, the first dimension including a number of concepts that each represent a subject attribute, the second dimension including a number of concepts that each represent an author attribute; generating machine learning classification training for the concepts in the first and second dimensions; for each of the number of elements of textual data, processing the element against the machine learning classification training to identify which concepts appear in the element; identifying each intersecting set of concepts from the first and second dimensions; and for each intersecting set of concepts, generating a score representing a prevalence of the intersecting set of concepts within the stream of textual data.

In other embodiments, the present invention is implemented as a system comprising: one or more processors; and computer storage media storing computer executable instructions which when executed perform a method for generating a multidimensional synopsis of a stream of textual data, the method comprising: accessing a stream of textual data that includes a number of elements of textual data, each element of textual data being associated with an author and being directed to a particular subject; identifying a first dimension and a second dimension for the stream of textual data, the first dimension including a number of concepts that each represent a subject attribute, the second dimension including a number of concepts that each represent an author attribute; generating machine learning classification training for the concepts in the first and second dimensions; for each of the number of elements of textual data, determining, using the machine learning classification training, which sentence fragments within the element address a particular concept of the first or second dimension; identifying each intersecting set of concepts from the first and second dimensions; and for each intersecting set of concepts, generating a score representing a prevalence of the intersecting set of concepts within the stream of textual data.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, an element of textual data should be construed as an independent piece of textual data that was authored by or can otherwise be attributed to a particular entity (hereinafter "author"). Examples of elements of textual data include a review of a product, a comment in a discussion forum, collaboration solution, or social media feed, an entry in an event log, a support ticket, a contact center record, etc. A stream of textual data should be construed as a collection of related elements of textual data. For example, a stream of textual data could be the collection of all comments for a camera posted on Amazon.com. Similarly, a stream of textual data could be the collection of all support tickets.

A concept should be construed as an identifiable attribute of the textual data or of an author of the textual data, while a dimension should be construed as a logical grouping of concepts. Different dimensions and concepts can be defined based on the subject of the textual data. For example, in a typical embodiment, a "what" dimension could be identified which includes concepts representing different subjects addressed within the textual data while a "who" dimension could be identified which includes concepts representing different attributes of the authors of the textual data. In the case where the stream of textual data comprises reviews of a camera, the what dimension can include concepts representing attributes of the camera while the who dimension can include concepts representing attributes of the authors of the reviews. In some embodiments, more than two dimensions may be defined. For example, in addition to a what dimension and a who dimension, a where dimension and a when dimension may also be defined. With reference to the camera example, the where dimension may include concepts identifying where the author of the review lives (e.g., a North America concept and a Europe concept) whereas the when dimension may include concepts identifying a time of year to which the author's review pertains (e.g., spring, summer, fall, and winter concepts). Of course, other types of dimensions could be defined based on the type of textual data for which the multidimensional synopsis is being generated.

Figure 1:
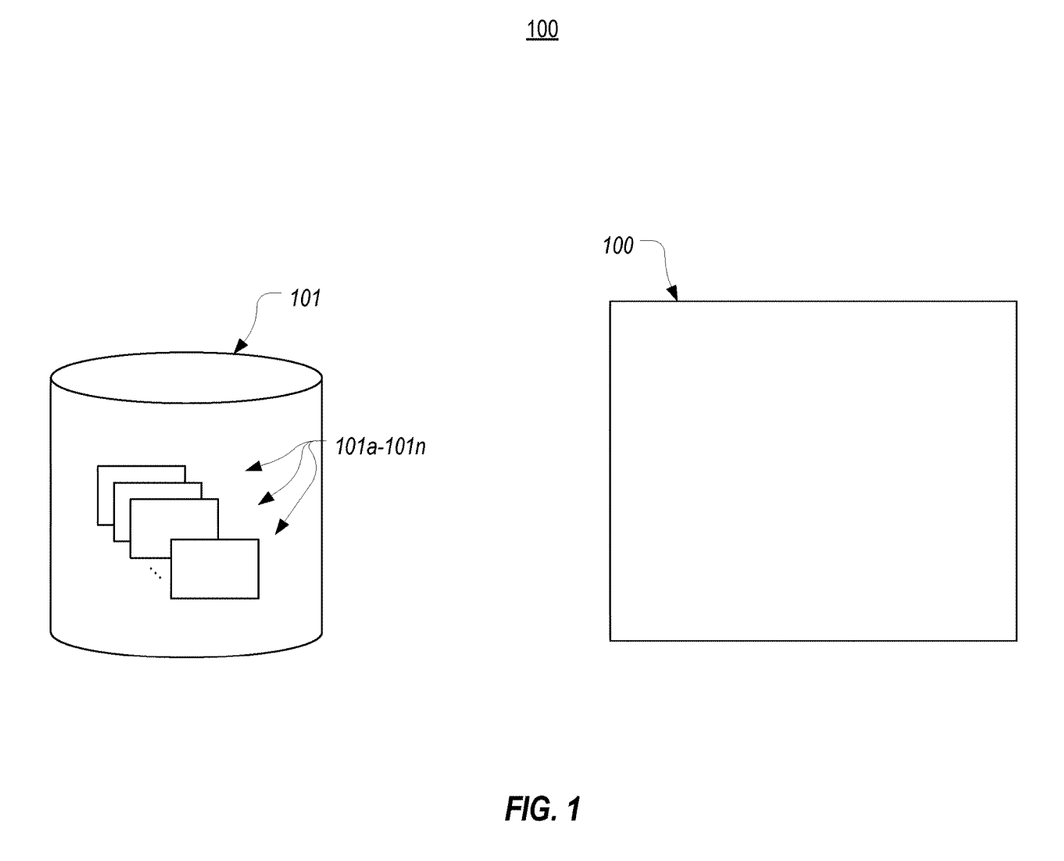
FIG. 1 illustrates an example computing environment in which the present invention can be implemented.

FIG. 1 illustrates an example computing environment 100 in which the present invention can be implemented. Computing environment 100 includes a processing unit 100 and a database 101. Processing unit 100 generally represents any computing device that is capable of performing the functionality described below for generating a multidimensional synopsis. Database 101 generally represents any storage device(s) that can be employed to store elements of textual data 101a-101n and to allow processing unit 100 to access the elements. In some embodiments, processing unit 100 and database 101 may form part of a single computing device, while in other embodiments these two components may be distributed among different computing devices or systems. Accordingly, the particular computing architecture employed to implement the following functionality is not essential to the invention.

Figure 2:
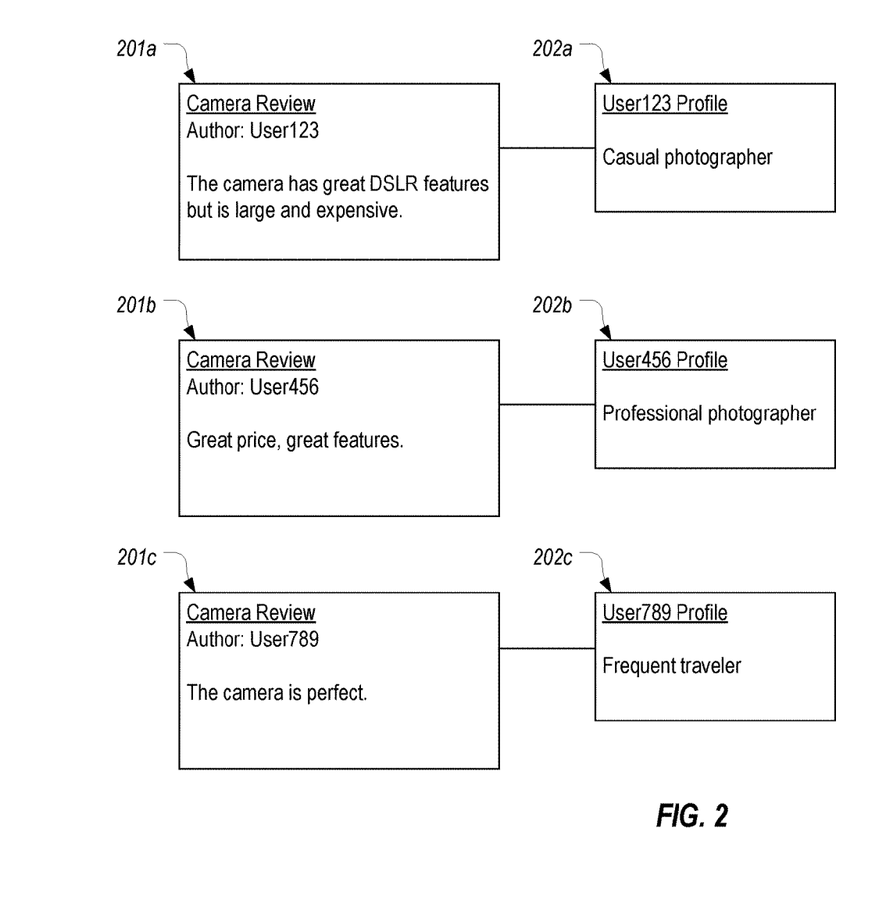
FIG. 2 illustrates a number of example user reviews of a camera and associated user profiles.

Prior to describing the process of generating a multidimensional synopsis, a simplified example of a stream of textual data will be illustrated to provide context to the description. This simplified example will be directed to a stream of textual data that comprises user reviews of a camera. Accordingly, FIG. 2 illustrates three camera reviews 201a-201c. It is noted, however, that in actual implementations a large number of elements of textual data would be analyzed. As indicated, camera reviews 201a-201c were authored by different users—User123, User456, and User789 respectively. FIG. 2 also indicates that each of these users has an associated profile 202a-202c that identifies one or more attributes of the user. Therefore, in this example, an element of textual data can be construed as including not only the review, but also the user profile of the review's author.

Reviews 201a-201c include textual data of: "The camera has great DSLR features but is large and expensive."; "Great price, good features."; and "I love all the great features." respectively. Profile 202a indicates that User123 is a casual photographer, profile 202b indicates that User456 is a professional photographer, and profile 202c indicates that User789 is a frequent traveler. Of course, reviews 201a-201c and profiles 202a-202c are very simple. In many implementations, a review or profile could contain a large amount of textual data providing substantial information about the camera or user. As indicated above, this textual data (reviews 201a-201c and profiles 202a-202c) could be stored in database 101 and made accessible to processing unit 100 to allow processing unit 100 to analyze the textual data to generate a multidimensional synopsis.

Figure 3:
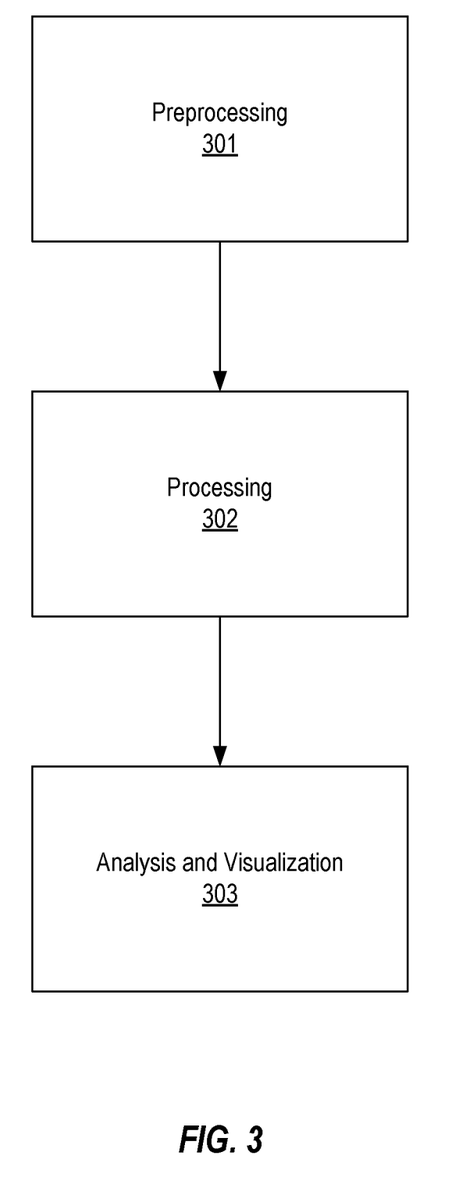
FIG. 3 illustrates steps of an example method for generating a multidimensional synopsis.

FIG. 3 illustrates the steps that processing unit 100 can perform to generate a multidimensional synopsis for a stream of textual data including a preprocessing step 301, a processing step 302, and an analysis and visualization step 303. Example results of performing these steps on the textual data in FIG. 2 will be provided below.

In preprocessing step 301, the dimensions and concepts of the multidimensional synopsis are determined and machine learning classification training and testing samples are created. Each concept of a dimension can be viewed as a label with each concept being associated with a number of keywords. The keywords can be any word or phrase that is likely to appear in the textual data when the concept is discussed. For example, if the concept is the size of the camera, keywords of "large" or "big" may be defined. In some embodiments, the dimension/concept labels and their associated keywords can be predefined. However, in other embodiments, the dimension/concept labels and their associated keywords may be generated by applying topic modeling techniques on the stream of textual data.

The machine learning classification training and testing samples can be generated using any available technique including those that are currently known in the art. In some embodiments, these training and testing samples can be created as sentence fragments to facilitate mapping textual data to multiple concepts. Also, in some embodiments, lemmatized sentence fragments may be employed. In embodiments where textual data in multiple languages exists, separate training and testing samples may be created in each language. However, in some embodiments, textual data may first be translated into a common language. Accordingly, after step 301, dimensions and concepts will be defined and machine learning classification will be available for each concept.

In processing step 302, each element of textual data in the stream is processed to identify each concept of each dimension that is addressed and/or associated with the element of textual data. Initially, each element can be cleaned and prepared by removing whitespace, converting to lowercase, removing stop words, replacing synonyms (via lemmatization or dictionary lookup), applying stemming, and/or applying parts-of-speech tagging. In other words, the textual data can be tokenized to facilitate applying the machine learning classification to the element. In embodiments where the textual data is in a language for which no machine learning classification is available, the textual data can also be translated into a language for which a machine learning classification is available.

Once an element is cleaned and prepared (and possibly translated), the machine learning classification can be applied to identify which concepts are addressed in the element. For example, processing unit 100 could identify that the textual data of a particular element includes the keyword "large" and, based on the machine learning classification, could determine that the element addresses the size concept. In some embodiments, the identification of an addressed concept can be performed on a sentence fragment level. In other words, the cleaning and preparing step can divide the element into sentence fragments and each sentence fragment can be analyzed to determine if it addresses a concept. Accordingly, after processing step 302, for each element of textual data, zero or more concepts will have been identified as being addressed or associated with the element.

In some embodiments, processing step 302 may also include determining a quantitative value for at least some of the concepts identified within an element of textual data. The type of quantitative value will vary based on the type of textual data. For example, for user reviews of a product, the quantitative value may be a sentiment value. In such cases processing unit 100 can perform sentiment analysis to generate a sentiment value for each addressed concept thereby indicating whether (and possibly to what extent) the concept is addressed in a positive, neutral, or negative manner. For example, with reference to the camera reviews of FIG. 2, if processing unit 100 identifies that the element includes the keyword "large" and that this keyword is preceded by "the camera is too," it can define a sentiment value that represents that the element of textual data addressed the size of the camera in a negative manner. Accordingly, in such cases, after processing step 302 has been performed, processing unit 100 will have identified which concepts each element of textual data addresses and will have assigned a sentiment value to at least some of these concepts.

Figure 4:
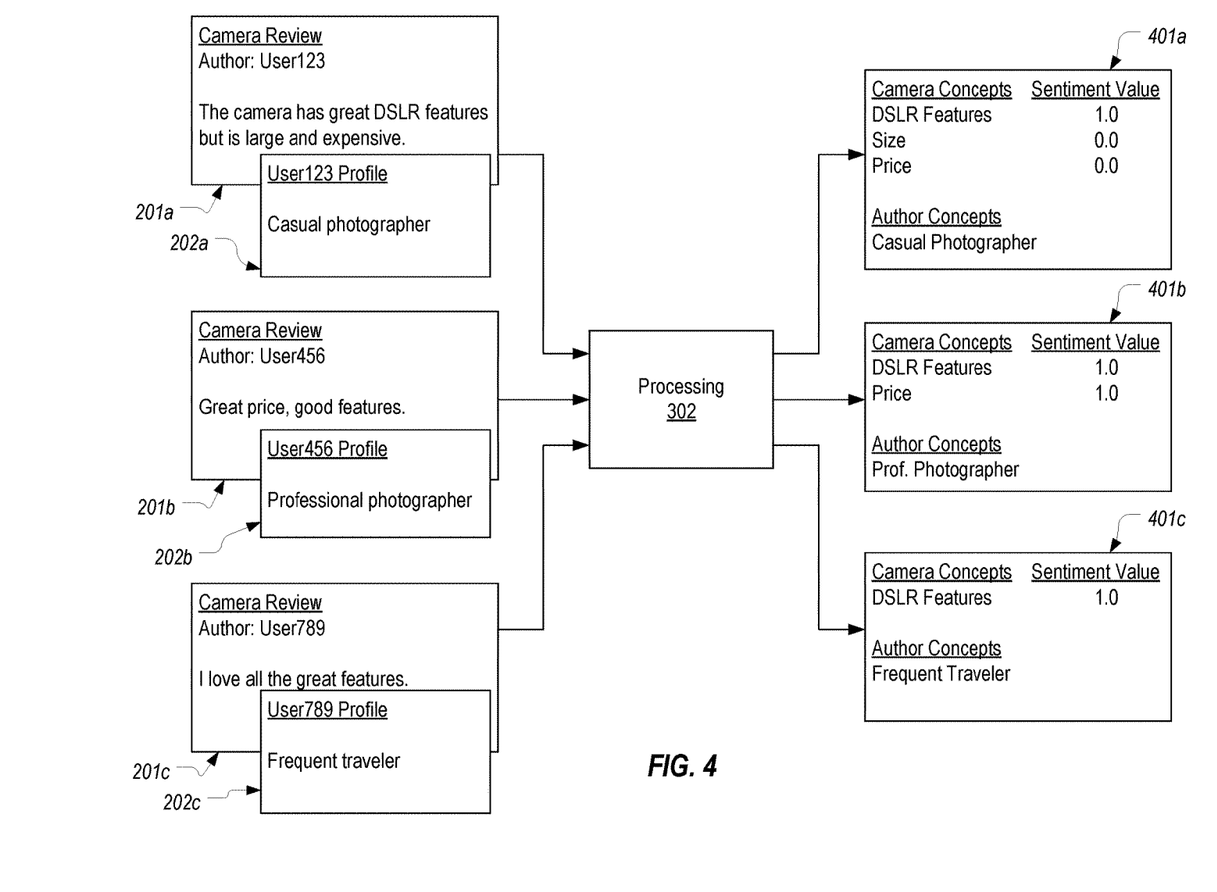
FIG. 4 illustrates an example of how a processing step can be performed to identify which concepts are addressed in the example user reviews of FIG. 2 and to generate a sentiment value for the camera concepts.

FIG. 4 provides an example of how processing step 302 can be implemented in the camera review example of FIG. 2. As shown, each review and its corresponding user profile is passed through processing step 302 to identify each concept in the element and assign a sentiment value to concepts pertaining to the camera dimension. For example, processing unit 100 can process review 201a and user profile 202a to generate a set 401a of concepts. In this case, the machine learning classification can determine that: the sentence fragment "The camera has great DSLR features" addresses the DSLR features concept; the sentence fragment "but is large" addresses the size feature; the sentence fragment "and expensive" addresses the price concept; and the sentence fragment "casual photographer" addresses the casual photographer concept. Then, sentiment analysis can be performed to determine a sentiment value for each identified camera concept. For example, it can be assumed that the presence of "great" before "DSLR features" results in a determination that this concept is positively addressed. In contrast, the sentiment analysis of "but is large" and "and expensive" can result in a determination that these concepts are negatively addressed. In this example, it will be assumed that a sentiment value of 1.0 indicates positive treatment and a sentiment value of 0.0 indicates negative treatment. Accordingly, set 401a assigns sentiment values of 1.0, 0.0, and 0.0 to the DSLR Features, Size, and Price concepts respectively. Similar processing can be performed to generate sets 401b and 401c for review 201b and user profile 202b and review 201c and user profile 202c respectively.

As indicated above, in some embodiments, the sentiment value could represent to what extent each concept is positively or negatively treated within the element of textual data. For example, a range between 0.00 and 1.00 could be employed where 1.00 represents a very positive view, 0.50 represents a neutral view, and 0.00 represents a very negative view of the corresponding camera attribute. Also, in the above example, it is assumed that an author concept is either present or not present. However, in some embodiments, such as when an author concept may be determined based on an analysis of the camera review rather than from a user profile (i.e., when there may not be a definitive indication of whether the author matches a particular concept), a value similar to a sentiment value may be used to represent how closely the author may match a particular concept.

To summarize processing step 302, processing unit 100 can identify which concepts of a "what" dimension are addressed in each element of textual data and can also identify which concepts of a "who" dimension the author of each element matches. In some embodiments, for each concept of the "what" dimension, processing unit 100 may also generate a quantitative value. Therefore, for each element of textual data, a set of concepts and possibly quantitative values for at least some of the concepts will exist after processing step 302.

After processing step 302 has been completed on a stream of textual data, processing unit 100 can perform analysis and visualization step 303 to generate and display a multidimensional synopsis for the stream. As an overview, this analysis can include identifying each intersecting set of concepts within each element of textual data and then generating a score for each intersecting set of concepts. FIGS. 5A-5D illustrate an example of how this can be accomplished using the camera example.

Figure 5A:
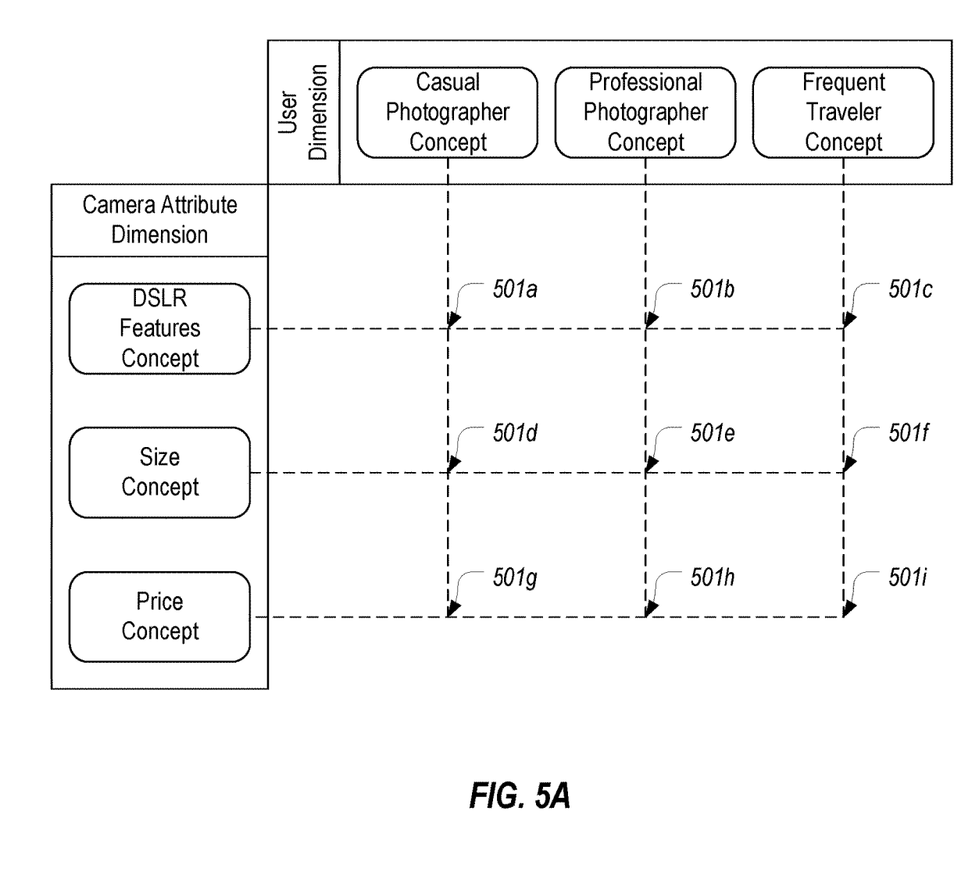
FIGS. 5A-5D illustrates how a multidimensional synopsis can be generated after the example user reviews have been processed to identify which concepts they address.

FIG. 5A illustrates each of the possible intersecting sets of concepts that would exist in the camera example employed above. As shown and addressed above, it will be assumed that three concepts are defined in each of the user and camera attribute dimensions. Accordingly, a total of nine intersections 501a-501i of concepts exist. The reason for employing these intersecting sets of concepts is that it allows a score to be generated that is particular to the two intersecting concepts. For example, a score could be generated that represents how casual photographers feel about the DSLR features of the camera (i.e., a score for intersection 501a). In cases where more than two dimensions are employed, a score could be generated for a set of intersecting concepts from two or more of the dimensions. For example, if a where dimension were also defined for the stream of camera reviews, intersecting sets of three concepts (one from each dimension) could be defined whether in place of or in addition to the nine intersecting sets 501a-501i. As an example, a score could be generated that represents how casual photographers in North America feel about the DSLR features while a different score could be generated that represents how casual photographers in Europe feel about the DSLR features.

Figure 5B:
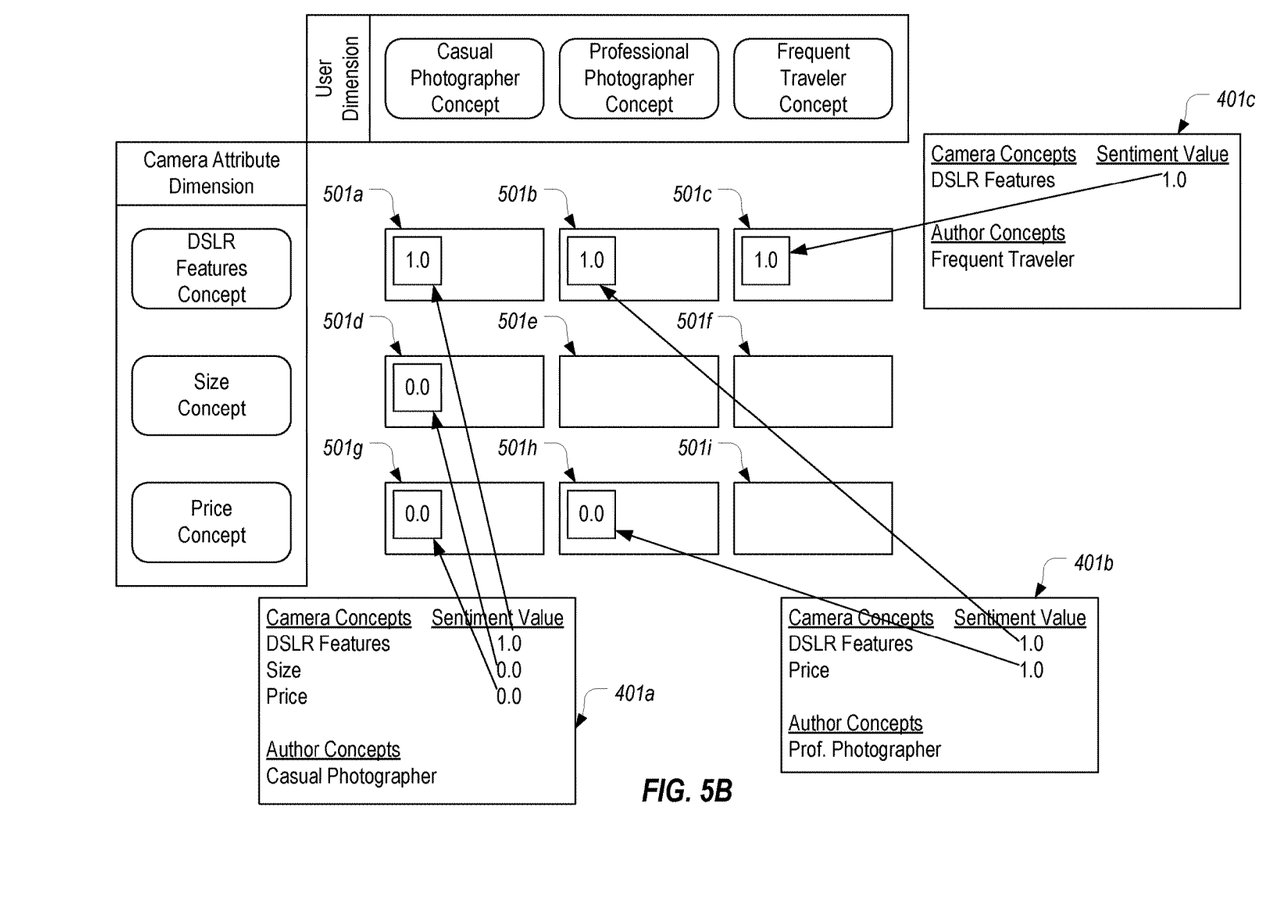

FIG. 5B illustrates how the sentiment values of FIG. 4 can be mapped into the appropriate intersection. As shown, set 401a includes sentiment values for the DSLR features, size, and price concepts and also includes the casual photographer concept. Accordingly, the sentiment values of 1.0, 0.0, and 0.0 are mapped into intersections 501a, 501d, and 501g respectively since these intersections represent the intersection of the casual photographer concept with the three concepts in the camera attribute dimension. Likewise, the sentiment values from set 401b are mapped into intersections 501b and 501h since set 401b includes the professional photographer concept, and the sentiment value from set 401c is mapped into intersection 501c since set 401c includes the frequent traveler concept. It is noted that intersections 501e, 501f, and 501i do not include any sentiment values since sets 401a-401c did not include any sentiment values that would have mapped into these intersections. This same process could be performed regardless of the number of dimensions involved.

Figure 5C:
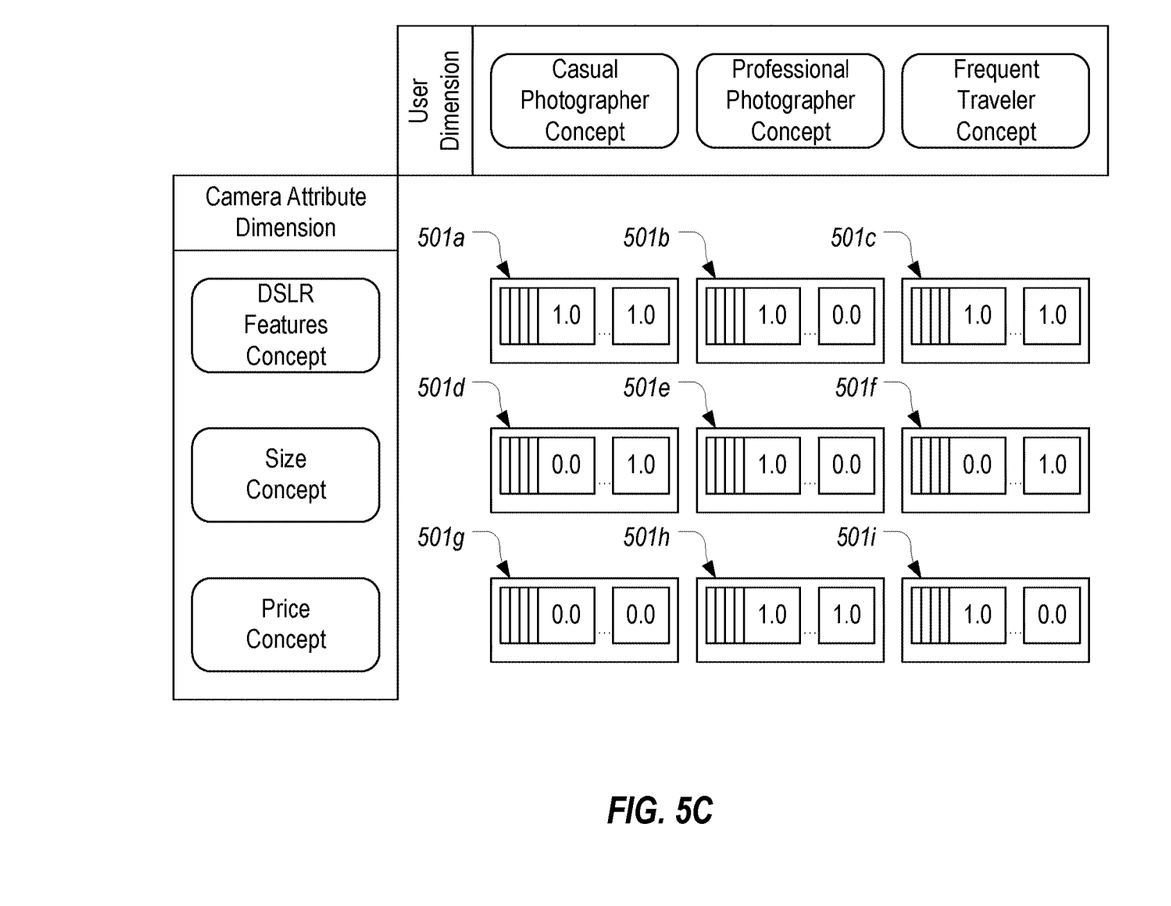

As indicated above, in typical implementations, a large number of camera reviews would be processed resulting in a large number of sentiment values which could each be mapped to the corresponding intersection in the manner described above. Therefore, FIG. 5C illustrates that a number of additional sentiment values have been mapped into the appropriate intersections. In any given implementation, hundreds, thousands, or even millions of quantitative values may be mapped into an intersection depending on the number of elements of textual data that exist in the stream and how prevalent a set of intersecting concepts is within the stream. In any case, once quantitative values are mapped into the appropriate intersection, a score can be generated for that intersection.

Figure 5D:
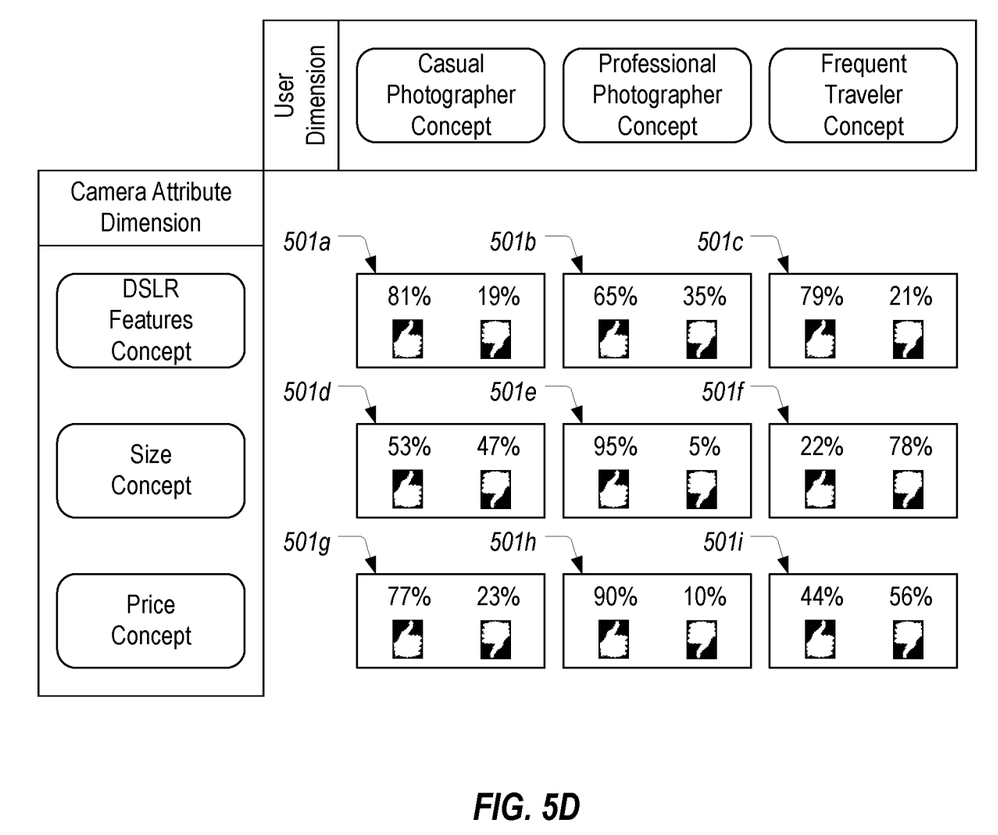

FIG. 5D illustrates how a score may be generated and displayed for each intersection 501a-501i. In this example, it will be assumed that for each intersection 501a-501i, a count of the total number of sentiment values that are mapped to it is maintained and that the scores will be represented as percentages. Accordingly, the percentage of these sentiment values that are positive and the percentage that are negative are determined. For example, if 100 sentiment values are mapped to intersection 501a and 81 are positive while 19 are negative, percentages of 81 and 19 can be determined. These percentages can then be displayed in conjunction with their corresponding concepts such as is shown in FIG. 5D.

By generating scores for each intersecting concept, a multidimensional synopsis is produced. The multidimensional synopsis can assist a viewer in quickly identifying the most relevant data for that viewer. For example, with reference to FIG. 5D, if a viewer that self-identifies as a casual photographer were researching whether to purchase the camera, the viewer could employ the scores in intersections 501a, 501d, and 501g to guide the purchase decision while possibly ignoring the other scores that were generated based on reviews from users that are not considered casual photographers. However, without the present invention, the viewer may have to individually read reviews and manually determine whether to give any credence to the review. Accordingly, the present invention can greatly increase the ability to identify relevant information from a stream of textual data.

Figure 6A:
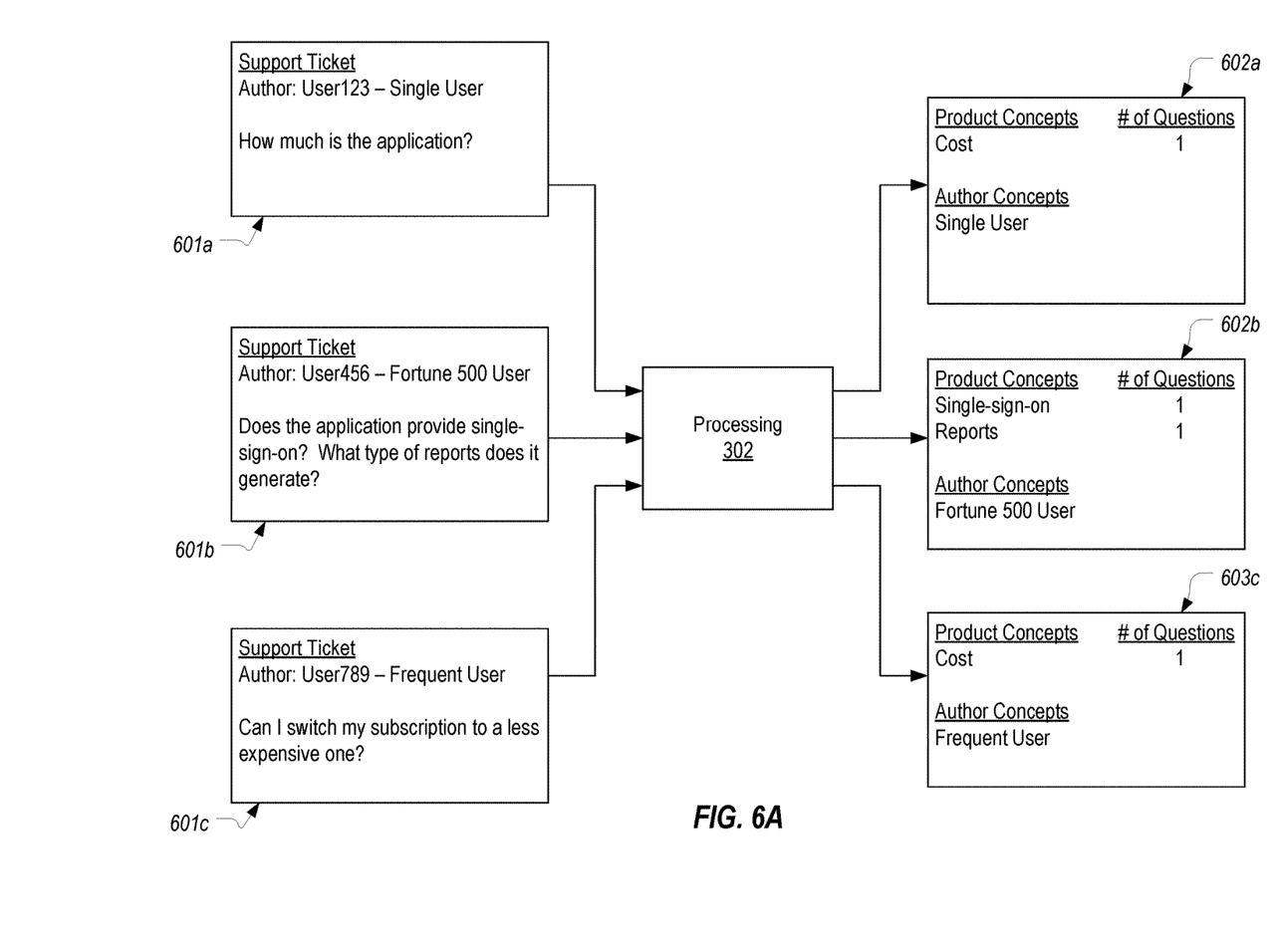
FIGS. 6A and 6B provide an example of how a multidimensional synopsis may be generated from a stream of textual data that comprises support tickets.
Figure 6B:
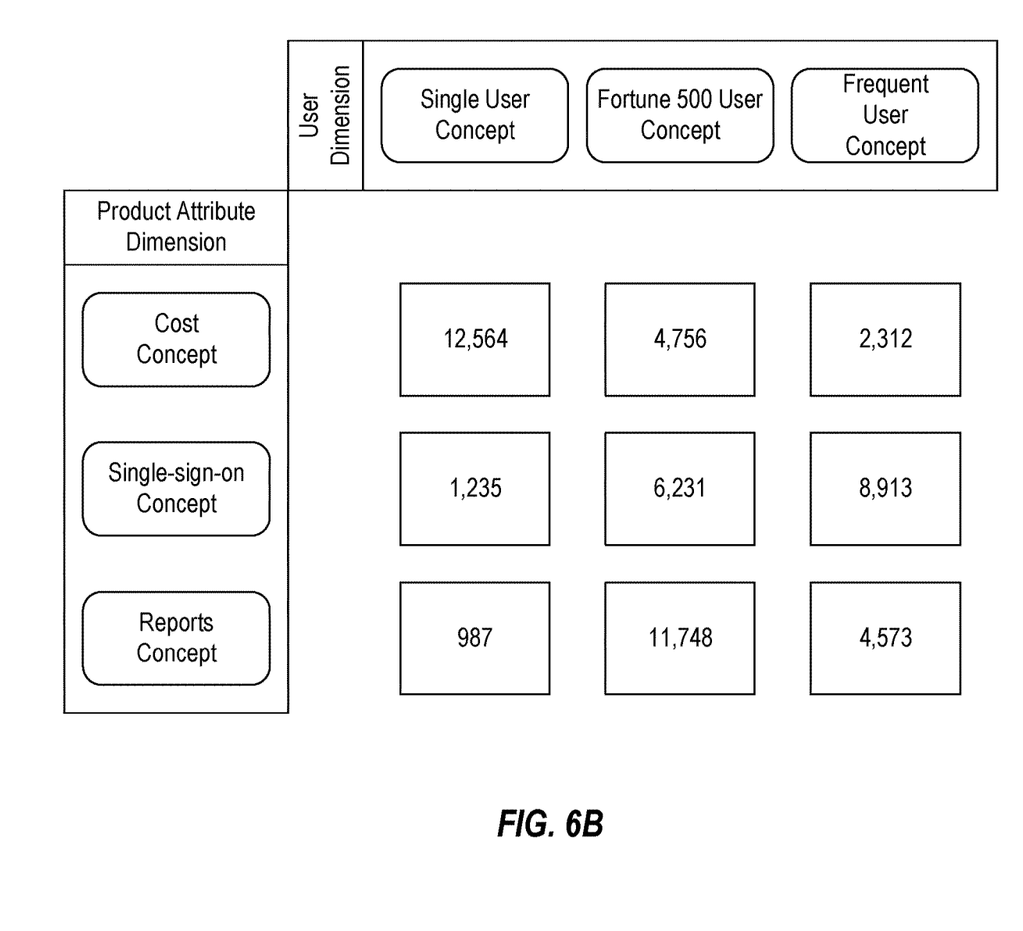

To illustrate how the invention may be implemented with other types of textual data, FIGS. 6A and 6B provide an example of how a multidimensional synopsis could be generated from support tickets pertaining to a particular product. In this example, a first dimension includes concepts representing attributes of the user that submitted the support ticket and a second dimension includes concepts representing features of the product for which the support ticket was submitted. For simplicity, the product attribute dimension will be assumed to include a cost concept, a single-sign-on concept, and a reports concept, while the user dimension will be assumed to include a single user concept, a fortune 500 user concept, and a frequent user concept. These concepts could be determined in the manner described above.

FIG. 6A, like FIG. 4, illustrates how an element of textual data, which in this case is a support ticket, can be processed via processing step 302. As shown, each of support tickets 601a-601c is processed to generate sets 602a-602c with each of these sets indicating which concepts appear in or are otherwise associated with the corresponding support ticket. In this example, it will be assumed that the quantitative value represents the number of questions pertaining to a particular concept that appear in the support ticket. It is noted, however, that this example could be implemented without generating quantitative values for the concepts. In particular, for each support ticket, the support concepts that appear could merely be identified without also identifying the number of questions that pertain to the support concept. In other words, processing step 302 may not account for support tickets that may include multiple questions that are directed to the same product concept.

Therefore, at a minimum, processing step 302 may produce sets that define which concepts appear in the support ticket, and, in some embodiments, may also produce a quantitative value for each product concept representing the number of questions in the support ticket that are directed to that concept. After these sets are generated, analysis and visualization step 303 can be performed to produce scores for each intersecting set of concepts. In this case, the scores can be generated by summing the appropriate quantitative values (or if quantitative values are not generated, by determining the number of occurrences of concept intersections).

FIG. 6B illustrates an example of scores that may be generated in this support ticket example. For example, as shown, it is assumed that single users asked 12,564 questions pertaining to cost of the product whereas fortune 500 users asked only 4,756 questions pertaining to cost. The other intersections also include scores representing how many questions were asked by the particular classification of user and pertaining to the particular product attribute. These scores could therefore assist in identifying which features of the product appear to be most important or relevant to a particular type of user.

Figure 7:
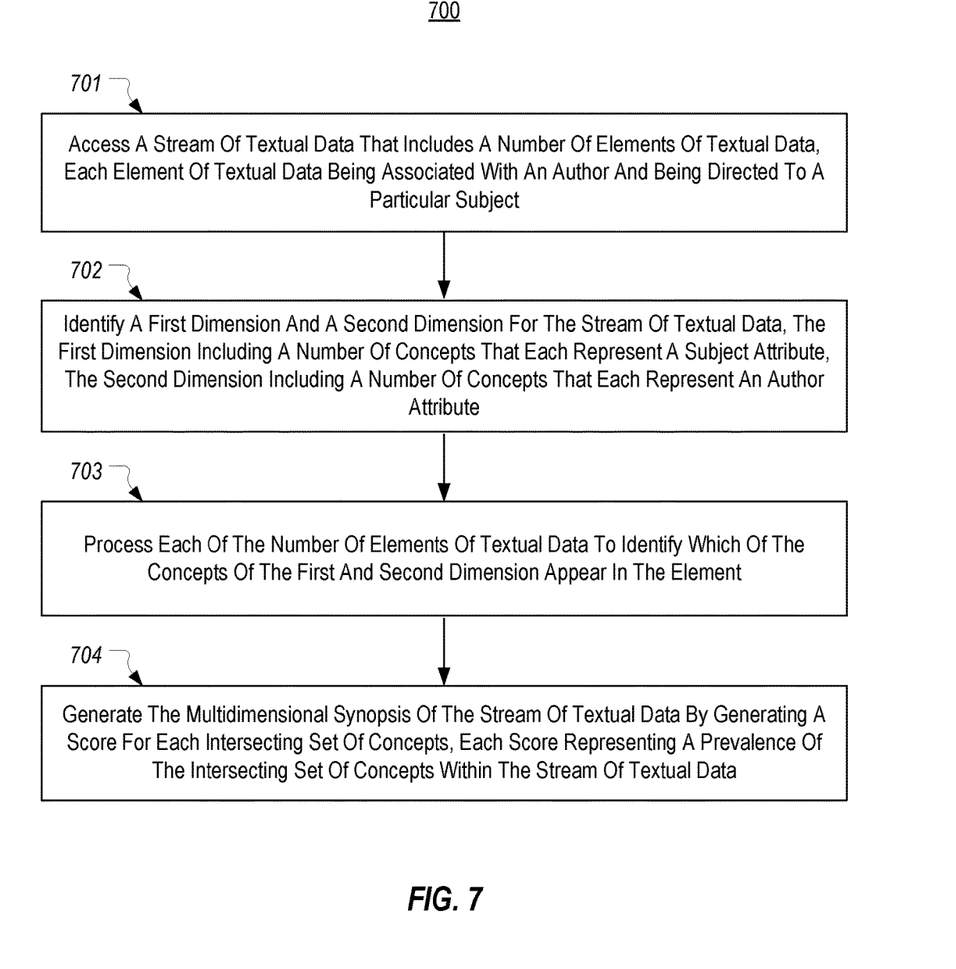
FIG. 7 illustrates a flowchart of an example method for generating a multidimensional synopsis of a stream of textual data.

FIG. 7 illustrates a flowchart of an example method 700 for generating a multidimensional synopsis of a stream of textual data. Method 700 will be described with reference to the camera example presented above and depicted in the figures.

Method 700 includes an act 701 of accessing a stream of textual data that includes a number of elements of textual data, each element of textual data being associated with an author and being directed to a particular subject. For example, processing unit 100 can access reviews 201a-201c (and likely a large number of additional reviews).

Method 700 includes an act 702 of identifying a first dimension and a second dimension for the stream of textual data, the first dimension including a number of concepts that each represent a subject attribute, the second dimension including a number of concepts that each represent an author attribute. In some embodiments, processing unit 100 may employ dimensions and concepts that were previously defined. In other embodiments, processing unit 100 may preprocess reviews 201a-201c (and likely a large number of additional reviews) to generate suitable dimensions and concepts.

Method 700 includes an act 703 of processing each of the number of elements of textual data to identify which of the concepts of the first and second dimension appear in the element. For example, processing unit 100 can perform processing step 302 to generate sets 401a-401c from reviews 201a-201c and corresponding user profiles 202a-202c.

Method 700 includes an act 704 of generating the multi-dimensional synopsis of the stream of textual data by generating a score for each intersecting set of concepts, each score representing a prevalence of the intersecting set of concepts within the stream of textual data. For example, processing unit 100 can generate the scores depicted in FIG. 5D to identify what percentage of users of a particular type viewed a particular feature positively or negatively.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by one or more processors in a computing system, for generating a multidimensional synopsis of a stream of textual data, the method comprising:
    accessing, by the one or more processors, a stream of textual data that includes a number of elements of textual data, each element of textual data comprising plain text content that is associated with an author and is directed to a particular subject;
    identifying, by the one or more processors, a first dimension and a second dimension for the stream of textual data, the first dimension including a number of concepts that each represent a subject attribute of the particular subject, the second dimension including a number of concepts that each represent an author attribute;
    processing, by the one or more processors, each of the number of elements of textual data to identify which of the concepts of the first and second dimension appear in the plain text content included in the element, and for each concept within the first dimension that appears in the plain text content included in the element, generating a quantitative value; and
    generating, by the one or more processors, the multidimensional synopsis of the stream of textual data by generating a score for each intersecting set of concepts from the corresponding quantitative values, each score representing a prevalence of the intersecting set of concepts within the stream of textual data.

2. The method of claim 1, wherein the quantitative value defines a sentiment of the author of the plain text content included in the element of textual data towards the subject attribute represented by the concept.

3. The method of claim 1, wherein the quantitative value defines an occurrence of a question directed towards the subject attribute represented by the concept.

4. The method of claim 1, wherein the score is generated by summing the quantitative values.

5. The method of claim 1, wherein the score for each intersecting set of concepts includes a positive component and a negative component.

6. The method of claim 1, wherein the first dimension and second dimension and the concepts of each dimension are generated by analyzing the stream of textual data.

7. The method of claim 1, wherein processing each of the number of elements of textual data to identify which of the concepts of the first and second dimension appear in the plain text content included in the element comprises performing natural language processing on the number of elements of textual data.

8. The method of claim 1, wherein identifying a first dimension and a second dimension for the stream of textual data further includes identifying one or more additional dimensions, each additional dimension including a number of concepts;
wherein processing each of the number of elements of textual data to identify which of the concepts of the first and second dimension appear in the plain text content included in the element further includes processing each of the number of elements of textual data to identify which of the concepts of each of the one or more additional dimension appear in the plain text content included in the element; and
wherein each intersecting set of concepts includes a concept from at least two of the dimensions.

9. The method of claim 1, wherein the elements of textual data comprise user reviews of a product such that the first dimension includes concepts that represent attributes of the product and the second dimension includes concepts that represent possible classifications of users.

10. One or more computer storage media storing computer executable instructions which when executed by one or more processors implements a method for generating a multidimensional synopsis of a stream of textual data, the method comprising:
accessing a stream of textual data that includes a number of elements of textual data, each element of textual data comprising plain text content that is associated with an author and is directed to a particular subject;
identifying a first dimension and a second dimension for the stream of textual data, the first dimension including a number of concepts that each represent a subject attribute of the particular subject, the second dimension including a number of concepts that each represent an author attribute;
generating machine learning classification training for the concepts in the first and second dimensions;
for each of the number of elements of textual data, processing the element against the machine learning classification training to identify which concepts appear in the plain text content included in the element, and for each concept within the first dimension that appears in the plain text content included in the element, generating a quantitative value;
identifying each intersecting set of concepts from the first and second dimensions; and
for each intersecting set of concepts, generating a score from the corresponding quantitative values, the score representing a prevalence of the intersecting set of concepts within the stream of textual data.

11. The computer storage media of claim 10, wherein the quantitative values are sentiment values.

12. The computer storage media of claim 10, wherein the score for each intersecting set of concepts includes a positive component and a negative component.

13. The computer storage media of claim 10, wherein identifying a first dimension and a second dimension for the stream of textual data further includes identifying one or more additional dimensions, each additional dimension including a number of concepts; and
wherein identifying each intersecting set of concepts from the first and second dimensions comprises identifying at least some intersecting sets of concepts from the first, second, and one or more additional dimensions.

14. A system comprising:
one or more processors; and
computer storage media storing computer executable instructions which when executed perform a method for generating a multidimensional synopsis of a stream of textual data, the method comprising:
accessing a stream of textual data that includes a number of elements of textual data, each element of textual data comprising plain text content that is associated with an author and is directed to a particular subject;
identifying a first dimension and a second dimension for the stream of textual data, the first dimension including a number of concepts that each represent a subject attribute of the particular subject, the second dimension including a number of concepts that each represent an author attribute;
generating machine learning classification training for the concepts in the first and second dimensions;
for each of the number of elements of textual data, determining, using the machine learning classification training, which sentence fragments within the plain text content included in the element address a particular concept of the first or second dimension, and for each concept within the first dimension that appears in the plain text content included in the element, generating a quantitative value;
identifying each intersecting set of concepts from the first and second dimensions; and
for each intersecting set of concepts, generating a score from the corresponding quantitative values, the score representing a prevalence of the intersecting set of concepts within the stream of textual data.

15. The system of claim 14, wherein each quantitative value defines one of:
a sentiment of the author of the plain text content included in the element of textual data towards the subject attribute represented by the concept; or
an occurrence of a question directed towards the subject attribute represented by the concept.

* * * * *